United States Patent [19]
Demarest et al.

[11] Patent Number: 5,727,668
[45] Date of Patent: *Mar. 17, 1998

[54] NEEDLE SORTING DEVICE

[75] Inventors: David Demarest, Parsippany; John F. Blanch, Tinton Falls, both of N.J.

[73] Assignee: Ethicon, Inc., Somerville, N.J.

[*] Notice: The term of this patent shall not extend beyond the expiration date of Pat. No. 5,511,670.

[21] Appl. No.: 715,790

[22] Filed: Sep. 19, 1996

Related U.S. Application Data

[63] Continuation of Ser. No. 567,264, Dec. 5, 1995, abandoned, which is a continuation of Ser. No. 181,600, Jan. 13, 1994, Pat. No. 5,511,670.

[51] Int. Cl.$^6$ ................................................ B65G 47/26
[52] U.S. Cl. .................... 198/431; 198/803.7; 209/542; 209/564; 209/903
[58] Field of Search ........................ 198/395, 431, 198/448, 606, 803.3, 803.7; 209/540, 542, 559, 564, 903, 939; 250/223 R

[56] References Cited

U.S. PATENT DOCUMENTS

| | | | |
|---|---|---|---|
| 3,611,551 | 10/1971 | Shave et al. | 29/515 |
| 3,980,177 | 9/1976 | McGregor | 206/633 |
| 4,011,155 | 3/1977 | Feurstein et al. | 209/597 X |
| 4,651,879 | 3/1987 | Harris et al. | 198/803.7 X |
| 4,744,035 | 5/1988 | Hashim | 209/576 X |
| 4,909,376 | 3/1990 | Herndon et al. | 198/395 |
| 4,922,904 | 5/1990 | Uetake et al. | 606/226 |
| 5,065,237 | 11/1991 | Tsikos et al. | 209/586 X |
| 5,150,307 | 9/1992 | McCourt et al. | 209/556 X |
| 5,253,765 | 10/1993 | Moorehead et al. | 209/587 X |
| 5,370,216 | 12/1994 | Tsuruyama et al. | 198/395 |

FOREIGN PATENT DOCUMENTS

| | | | |
|---|---|---|---|
| 581 699 | 2/1994 | European Pat. Off. | 209/598 |
| 2167211 | 5/1986 | United Kingdom | 198/395 |

*Primary Examiner*—Tuan Nguyen
*Attorney, Agent, or Firm*—Scully, Scott, Murphy & Presser

[57] ABSTRACT

A needle sorting device includes an infeed device which singulates and randomly deposits surgical needles upon a first conveyor for transmission to a processing station. Upon transit, one or more cameras to obtain an image of the deposited needles. The image is digitized and the digital signals are transmitted to a control system computer which evaluates the position and orientation for randomly positioned needles and processes the information to obtain data for communication to one or more robot assemblies having grippers. Utilizing the position and orientation data, the robot assembly grippers removes selected needles from the first conveyor and transfers each needle to an engagement device located upon a second precision conveyor. This second precision conveyor is provided with additional devices to further orient the needle transferred thereto. Each oriented needle is conveyed by the second conveyor to an automatic swaging station where sutures are automatically attached.

24 Claims, 14 Drawing Sheets

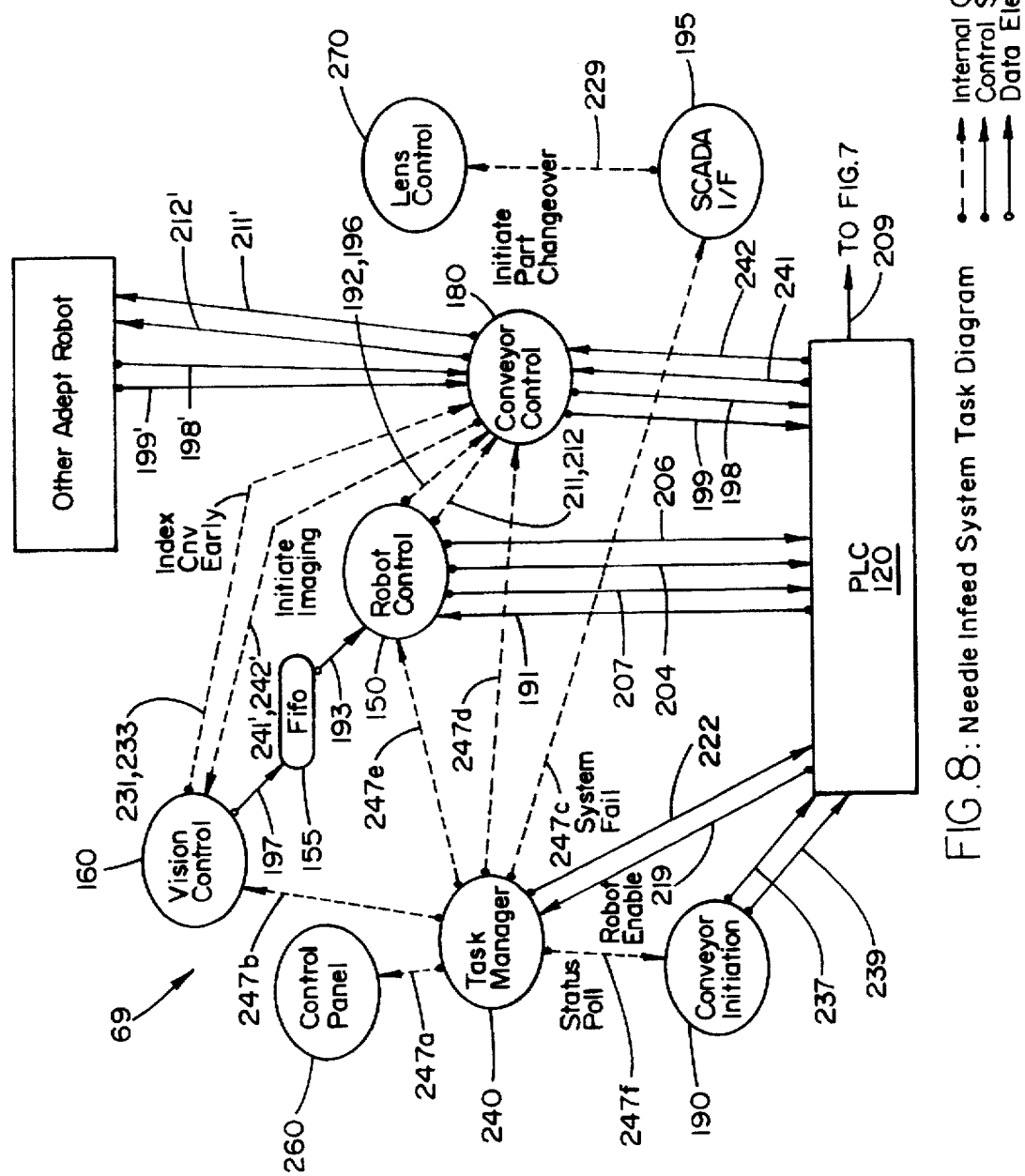
FIG. 8: Needle Infeed System Task Diagram

NEEDLE SORTING DEVICE

This is a continuation of application Ser. No. 08/567,264, filed on Dec. 5, 1995, now abandoned, which is a continuation of application Ser. No. 08/181,600 filed on Jan. 13, 1994, now U.S. Pat. No. 5,511,670.

1. Field of the Invention

The present invention relates generally to machines for automatically producing armed surgical needles, i.e., surgical needles having sutures attached thereto, and more specifically, to an infeed apparatus that automatically sorts needles and feeds them for further processing, for e.g., to an automatic swaging device.

2. Description of the Prior Art

Most armed surgical needles, i.e., needles having sutures attached to one end thereof, that are in present use by surgeons and medical personnel, are manufactured utilizing manual and semi-automated procedures such as those described in U.S. Pat. Nos. 3,611,551, 3,980,177, and 4,922,904. For instance, as described in U.S. Pat. No. 3,611,551, manual intervention is required by an operator to accurately position a suture within the needle for swaging and to adjust swaging dies to increase or decrease swage pressure when suture strands of different gauges are to be swaged. This process is costly in terms of man-hour labor and efficiency because manual positioning is required for swaging to take place.

Presently, suture material may be supplied wound on a bobbin, or, a king or driven spool before being cut and positioned within the swaging end of a surgical needle. In U.S. Pat. No. 3,980,177 the suture material is fed from a spool and taken up on a rotating tension rack where uniform length strands are subsequently cut. Thus, the length of the suture is determined by the size of the rack and manual intervention is required to prepare the rack for the cutting of the suture material wound thereabout. Moreover, manual intervention is required to change the rack each time a suture strand of different length is desired.

In U.S. Pat. No. 4,922,904, the suture material is supplied wound on a bobbin and is fed through various guide means and a heater for straightening the material, prior to insertion within the crimping cavity of the surgical needle. In one embodiment shown therein, an elaborate television monitoring means is required for aligning the drawn suture within the crimping cavity of the surgical needle prior to swaging thereof. In the same embodiment, a rotary encoder device is used to determine the length of suture material unwound from the bobbin prior to cutting. In an alternative embodiment, after swaging of the indefinite length of suture material to the needle, the needle-suture assembly is fed a predetermined distance prior to cutting to obtain a suture strand of predetermined length. Thus, to obtain uniform lengths of suture material every time requires careful manipulations and precise controls, and the processes used to accomplish these tasks are also costly in terms of man-hour labor and efficiency.

It would be highly desirable to provide an armed needle production and packaging system that is fully automated and that includes means for automatically feeding surgical needles to an automatic swaging machine for the swaging of sutures thereto.

It would also be highly desirable to provide in an armed needle production apparatus, a needle sorting device that can efficiently and accurately orient a needle for subsequent transference to an automatic swaging station.

Even more desirable would be the provision of a control system to maintain the efficiency and integrity of the needle sorting and transferring function.

SUMMARY OF THE INVENTION

Accordingly, it is an object of the instant invention to provide an automatic needle sorting device for conveying individual needles to a needle processing location.

It is another object of the instant invention to provide a cost effective needle sorting device that virtually eliminates operator exposure to repetitive manual operations.

It is another object of the instant invention to provide an automatic needle sorting device that positions needles in a precise and predetermined orientation for transfer to an automatic swaging station for attaching armed surgical needles thereto.

These and other objects of the present invention are attained with an apparatus for automatically sorting needles and preparing them for automatic swaging and packaging in a reduced size organizer. The needle sorting device comprises a receptacle means for holding a plurality of needles, the receptacle means being provided with a means for singulating and randomly depositing a predetermined amount of needles to a first conveyor means for conveyance thereof. A first set of remotely located video camera means obtains an image of the needles upon the first conveyor means and the image is subsequently digitized to enable processing by a control system computer. The digitized signals are processed and positional and orientation data for selected randomly deposited needles is generated.

A robot assembly is provided for transferring each of the selected randomly positioned needles from the first conveyor means to a second precision conveyance means for conveying the needles to an automatic swaging machine. The control system computer additionally generates instructions for use by the robot assembly based upon the positional and orientation data of the selected unoriented needle. The robot assembly receives the instructions from the control system so that a robot arm may grasp each selected needle and position it in an engagement device located upon the second conveyance means. One or more orientation devices are provided to ensure that the needles are all uniformly oriented up to within 0.001 of its specified position upon the second conveyor means, so that a transfer for subsequent swaging can effectively take place.

The needle sorting system is provided with a second set of video camera means and a second robot assembly means that operate in the manner as described above. The redundancy is designed in the system to ensure that a continuous and uninterrupted flow of about 60 needles/minute is supplied to the automatic swaging station.

Further benefits and advantages of the invention will become apparent from a consideration of the following detailed description given with reference to the accompanying drawings, which specify and show preferred embodiments of the invention.

BRIEF DESCRIPTION OF THE DRAWINGS

FIG. 8 is schematic representation of the control and data flow for each of the control tasks of the needle sorting apparatus of the present invention.

DETAILED DESCRIPTION OF THE PREFERRED EMBODIMENT

Figure 2:
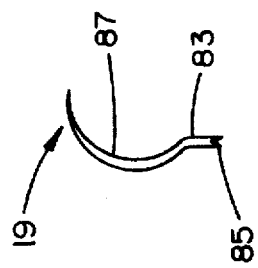
FIG. 2 is a surgical needle 19 with suture receiving end 85 and barrel portion 83 and arcuate blade portion 87.

This invention is drawn to a needle infeed apparatus that is designed to automatically sort, singulate, and convey surgical needles of various sizes to an automatic swaging station where sutures are attached to individual needles. A typical surgical needle 19 having a barrel portion 83, an arcuate blade portion 83, and a suture receiving end or opening 85 for swaging a suture thereto, is illustrated in FIG. 2.

Figure 1:
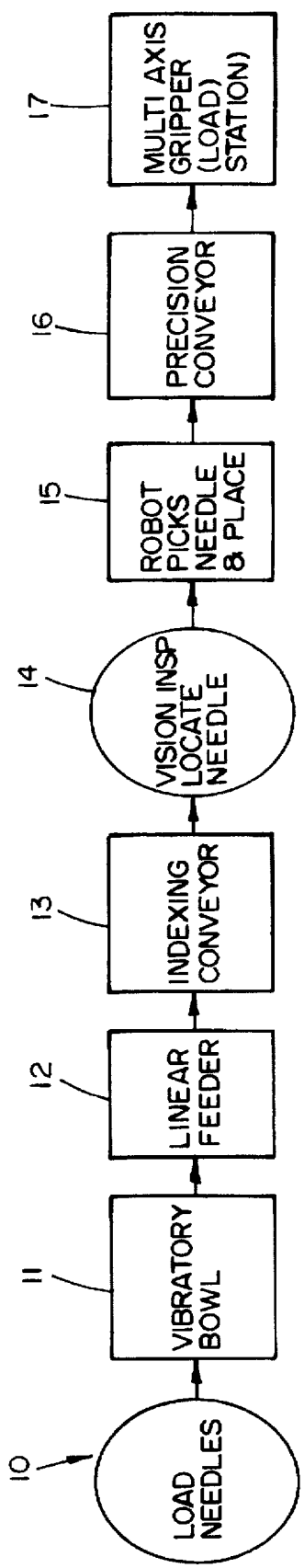
FIG. 1 is a block diagram showing the process flow for the needle sorting apparatus of the present invention.

FIG. 1 is a block diagram generally illustrating the process 10 used to sort needles prior to automatically swaging sutures thereto and prior to packaging them as a reduced size organizer. The automatic needle threading and swaging system and the automatic packaging system are both described in further detail in respective copending patent applications U.S. Ser. No. 08/181,598, entitled "Needle Threading Swedging System", (attorney docket No. 8922) and U.S. Ser. No. 08/181,626, entitled "Suture Winding Dial and Package Assembly Machine" (attorney docket No. 8925) assigned to the same assignee of the present invention. As previously mentioned, this invention is drawn to a needle sorting device used to sort, singulate, and convey surgeons' needles of various sizes to an automatic swaging station. A typical surgical needle 19 having a barrel portion 83, an arcuate blade portion 87, and a suture receiving end or opening 85 for swaging a suture thereto, is illustrated in FIG. 2.

Generally, in the automatic needle sorting process 10 shown in FIG. 1, needles are first loaded into a vibratory bowl at step 11, automatically sorted and linearly fed at step 12 to a translucent indexing conveyor at step 13, evaluated with respect to orientation and position by a vision tracking system which is part of a computer control system at step 14, picked up by a robot apparatus at step 15, transferred to a precision conveyor by the robot apparatus at step 16, and finally conveyed to a swaging station where the needles are transferred to a multi-axis indexing means for conveyance to subsequent swaging workstation at step 17. A detailed explanation of the apparatus used to carry out each step will be explained in further detail hereinbelow. A further explanation of the computer control system may be found in copending patent application U.S. Ser. No. 08/181,624, entitled "Robotic Control System" (attorney docket No. 8921) assigned to the same assignee of the present invention.

Figure 3A:
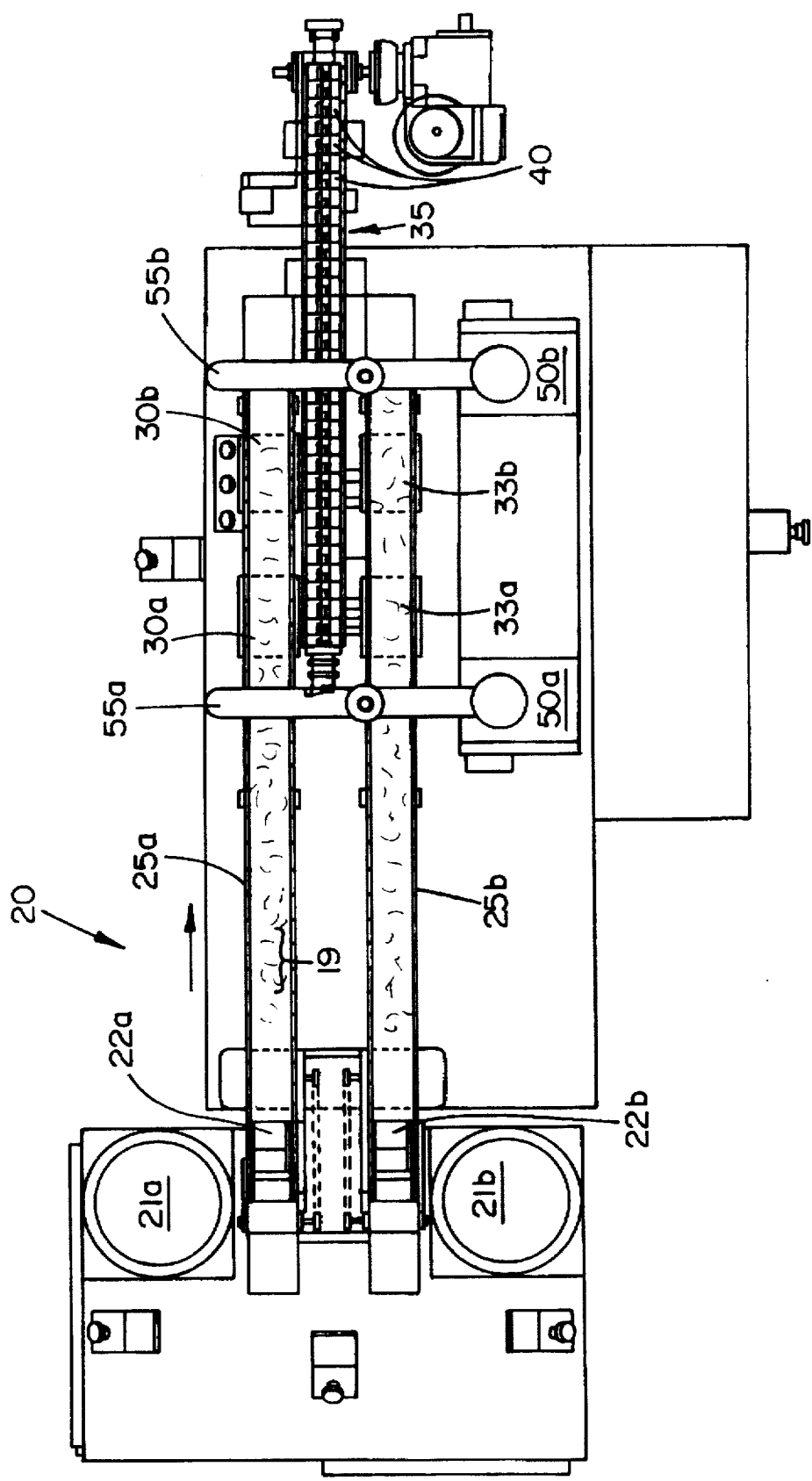
FIG. 3(a) is a top view of the needle sorting device 20 of the instant invention.
Figure 3B:
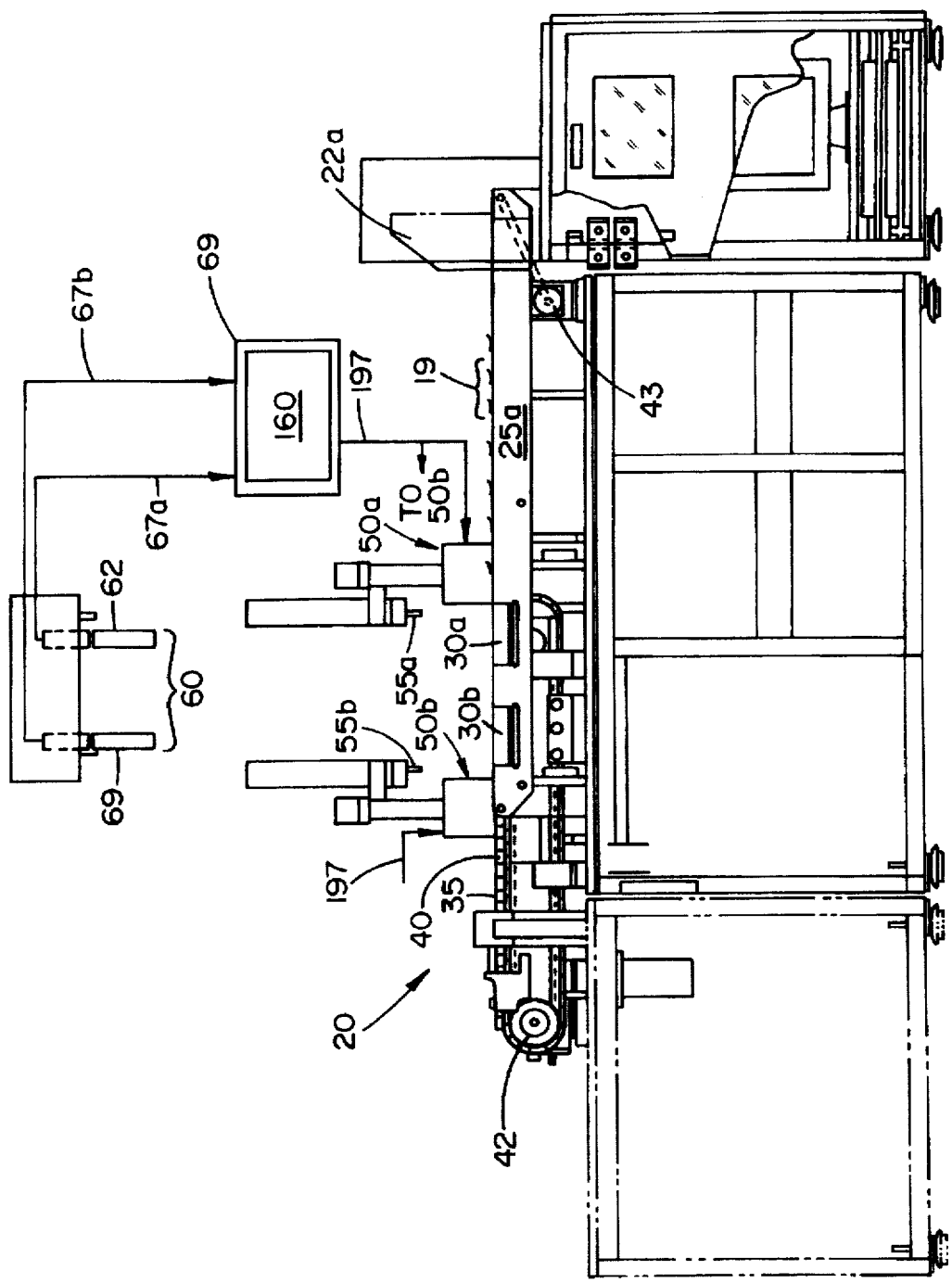
FIG. 3(b) is a side elevational view of the needle sorting device of FIG. 3(a) showing the robot assembly above the first conveyor means and the vision tracking means comprising two video cameras for obtaining images of the needles and the control system means for processing the image data.

The preferred embodiment of the needle sorting and infeed apparatus 20 is illustrated in the top view of the system in FIG. 3(a) and the side view of FIG. 3(b). As shown therein, needles 19 are delivered in bulk to each of two vibratory bowls or hoppers 21a,b where they are singulated by respective singulating assemblies 22a,b and randomly deposited upon each of two translucent conveyors 25a,b. The two translucent conveyors 25a,b carry the randomly deposited needles 19 in the direction indicated by the arrow in FIG. 3(a) where their position and orientation are evaluated by a remotely located vision tracking system that will be discussed in detail below with respect to FIG. 3(b). This tracking system, evaluates the position and orientation of each available needle upon translucent conveyor 25a as it forwardly conveys the needles over illuminated (backlit) platforms 30a and 30b, and further evaluates the position and orientation of the each available needle upon translucent conveyor 25b as it forwardly conveys the needles over illuminated (backlit) platforms 33a and 33b. The orientation and positional information obtained from the vision tracking system is processed and converted to information usable by each of two robot assemblies 50a,b for instructing respective robot grippers 55a,b to pick up and transfer identified needles from one of the translucent conveyors to individual engagement boats 40, located on a precision conveyor 35 that is also being indexed in the same direction as the translucent conveyors as shown in FIG. 3(a). The control system computer instructs a robot gripper, for e.g., gripper 55a of the robot assembly 50a, to grab the tracked needle from one of the two conveyors 25a,b for a dwell cycle of the system, i.e., when the respective conveyor has paused. If the randomly deposited needles 19 are oriented such that either of the robot grippers 55a,b is unable to pick one of them up or place the needle onto the precision conveyor because of its limited range of motion, a recovery procedure will be executed to ensure that there are no shortages of needles 19 to be fed by the precision conveyor 35 to the automatic high-speed swaging workstation (not shown) which can achieve up to 60 needle swages per minute.

In the preferred embodiment, the timing of each conveyor 25a,b is identical, but the dwell periods are out of phase. Because of the phased timing, the vision tracking system will be identifying needles on one indexing conveyor, for e.g. 25a, while both robots are picking needles from the other indexing conveyor 25b and placing each needle in an individual engagement boat of the precision conveyor. Similarly, while both robots are picking needles from the indexing conveyor 25a, the vision tracking system will be identifying needles on the other indexing conveyor 25b.

Figure 4A:
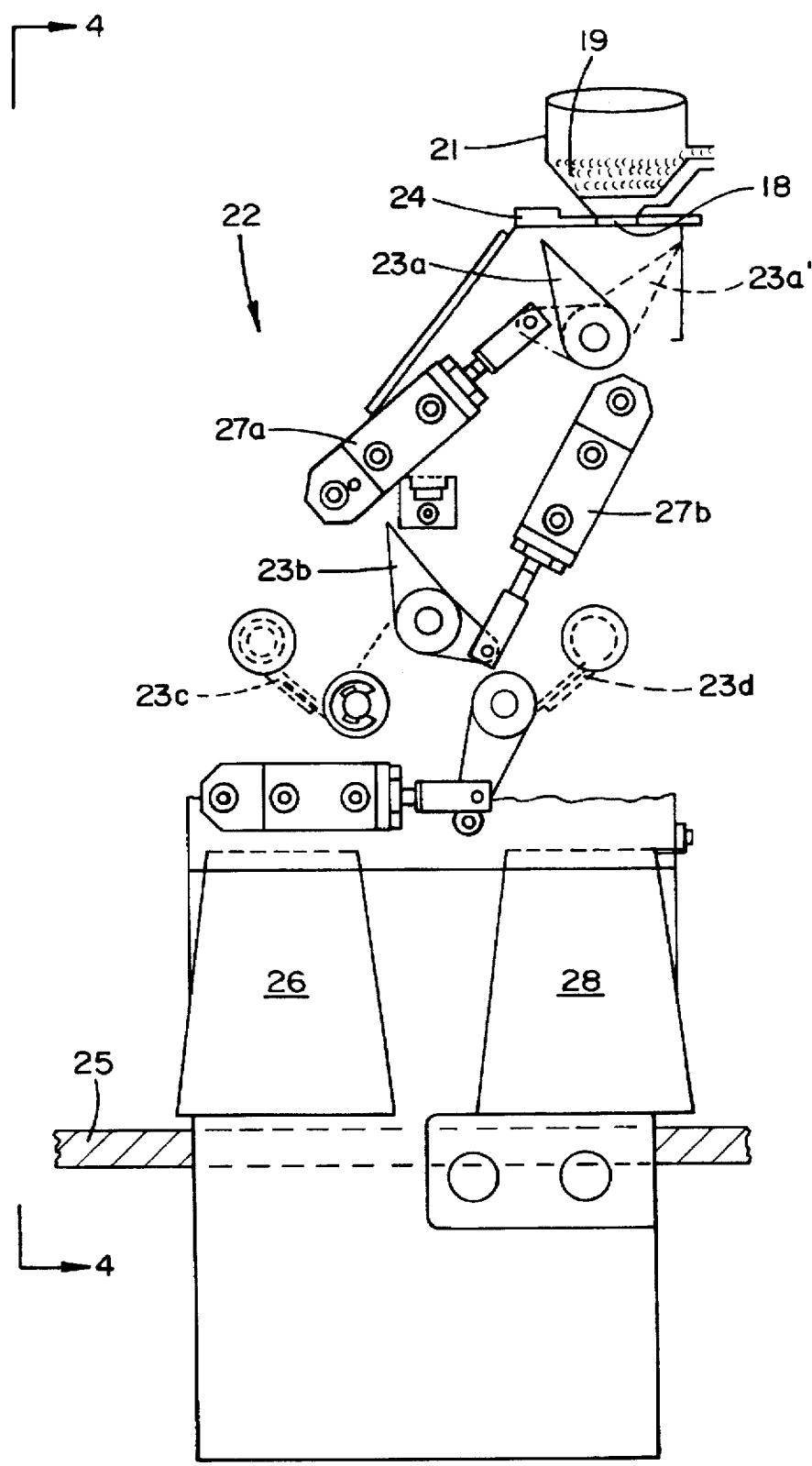
FIG. 4(a) is a detailed side view of the needle infeed means for singulating and depositing needles onto a translucent conveyor.
Figure 4B:
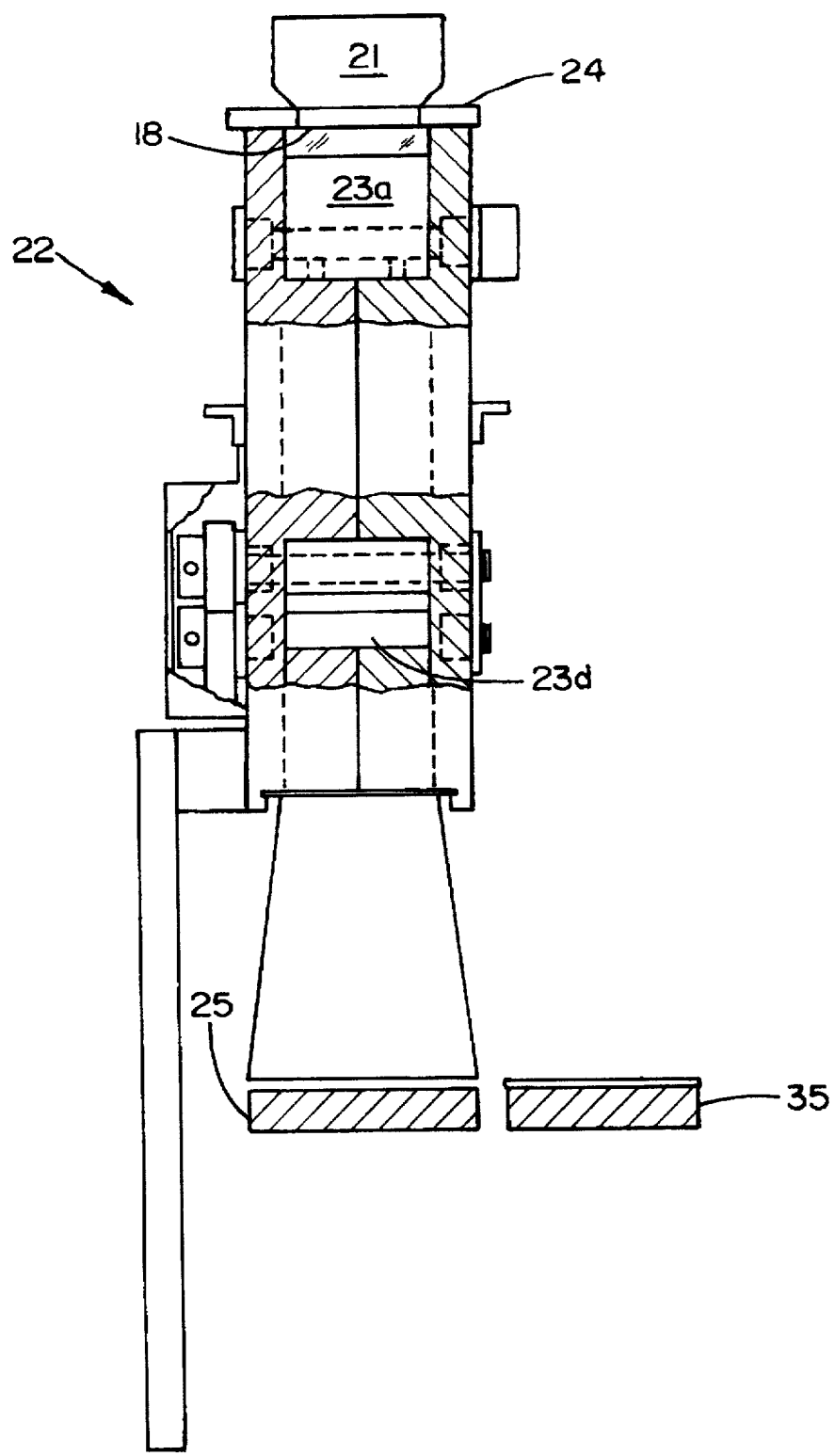
FIG. 4(b) is a view along line 4—4 of the conveyor infeed device of FIG. 4(a) showing the translucent conveyor exiting the infeed device and the precision conveyor running parallel thereto.

The first step of the automatic swage/wind process 10 involves introducing a predetermined amount of needles 19 from an infeed device, such as a bowl or hopper, into a needle singulating assembly. In the preferred embodiment shown in the side view of FIG. 4(a) and the sectional front view of FIG. 4(b), a vibratory hopper or bowl 21 is provided with a suitable optical or mechanical counting device such as sensor plate 24 so that up to six (6) needles may be periodically fed into the singulating assembly 22 at any one time. The needles 19 are discharged from the vibratory hopper 21 through a gate 18, and fall by gravity through a needle singulating assembly 22 which comprises a series of diverter doors 23a,b and trap doors 23c,d that alternate between two positions to allow one half of the needles discharged to drop onto each of two spaced-apart chutes 26,28 and finally onto a moving translucent conveyor 25a,b. With the diverter door 23a in the position shown in FIG. 4(a), any needle 19 introduced into the needle singulating assembly 22 will be deflected and fall into an external receptacle (not shown) where the needles may be subsequently returned to the hopper 21. When diverter door 23a is in a second position indicated by the dotted line diverter 23a' in FIG. 4(a), six (6) needles 19 will be counted by sensor 44 as they fall through the sorting assembly so that they may be singulated by appropriate switching of diverter door 23b and trap doors 23c,d. The reciprocating motion of the diverter doors 23a,b and trap doors 23c,d are timed to ensure that approximately six (6) needles are deposited on each conveyor 25a, b at a time. In the preferred embodiment, this amount of needle deposited will occupy approximately eight (8) inches of conveyor length, and thus, ensure that the needles are adequately spaced apart when deposited. Preferably, the diverter doors 23a,b operate under the control of an automatic control system and are timed to allow approximately three (3) needles to drop onto translucent conveyor 25a, b via each of the respective discharge chutes 26,28. Both diverter doors 23a,b are respectively driven by cylindrical pistons 27a,b and suitable solenoid or pneumatic motors (not shown). It should be understood that any needle 19 deposited on translucent conveyor 25a, b will be randomly positioned and unoriented. In the preferred embodiment, each translucent conveyor 25a, b is an endless loop conveyor that is driven at a rate of four inches per sec (4 in./sec) and runs parallel to a precision conveyor 35 as shown in FIGS. 3(a) and 4(b).

As described above, and in view of FIG. 3(a), the robot assembly comprises two robots 50a,b located downstream from each needle singulating assembly 22a,b and proximate both the precision and translucent indexing conveyors. In the preferred embodiment described herein, each robot assembly 50a,b is an Adept® 604-S robot capable of accomplishing needle transfers at a rate of approximately 40 transfers per minute as controlled by each robot's corresponding Adept® CC controller. Each robot is a four-axis SCARA (Selective Compliance Assembly Robot Arm) robot comprising four Joints: Joint 1, being the shoulder joint having a rotational range of motion of +/−100°; Joint 2, the elbow joint, having a rotational range of motion of +/−140°; Joint 3 providing translational motion for a robot quill for up to 150 mm in an up down motion; and, Joint 4, being the wrist joint, providing +/−360° rotational motion of the quill. Robot grippers 55a, b are attached to the quill of each respective robot assembly 50a,b and are enabled to provide gripping action by pressure supplied from an air cylinder (not shown).

Figure 5A:
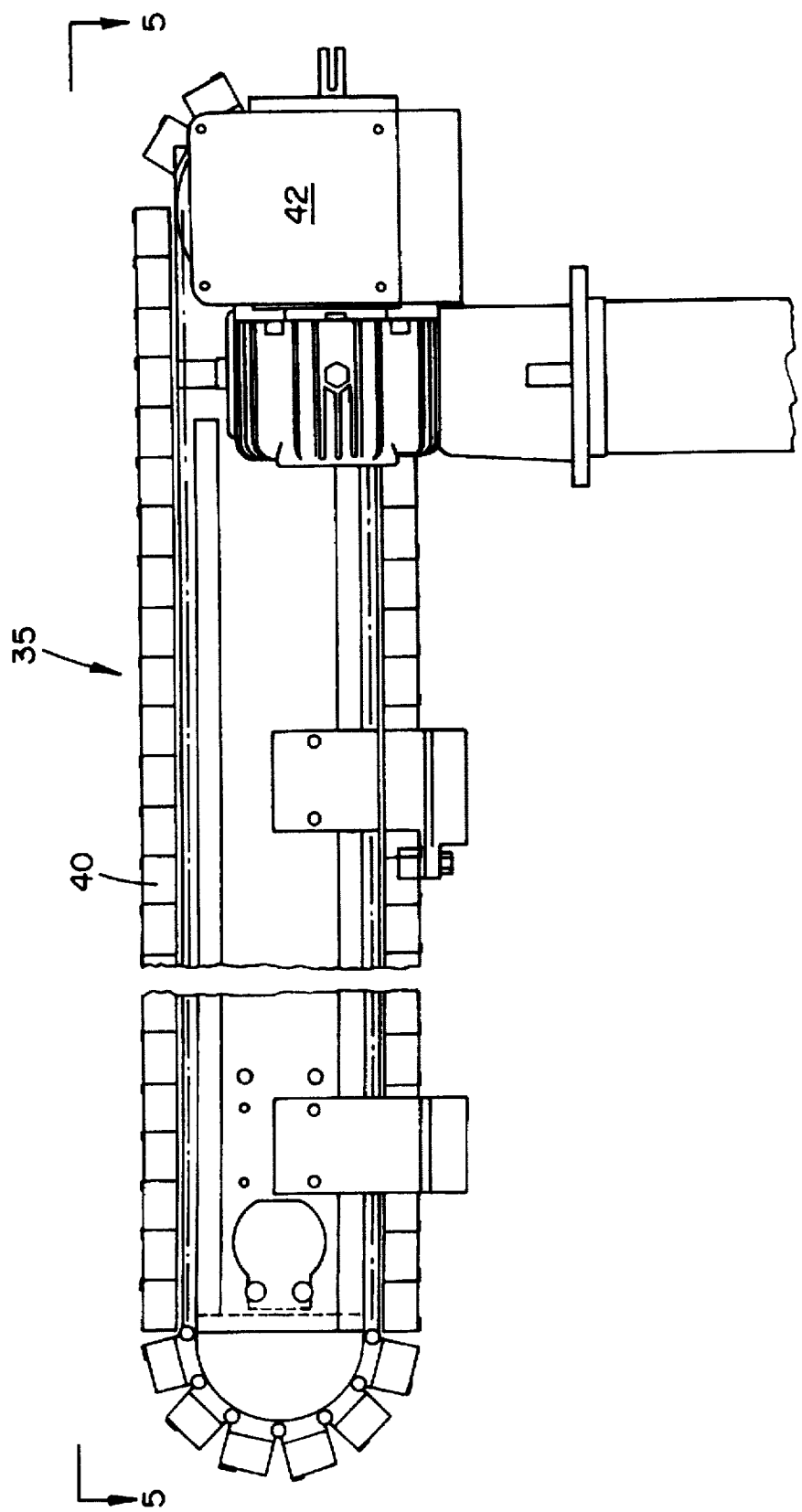
FIG. 5(a) is a side view of the precision conveyor for transporting needles in a specific orientation to an automatic swaging station.
Figure 5B:
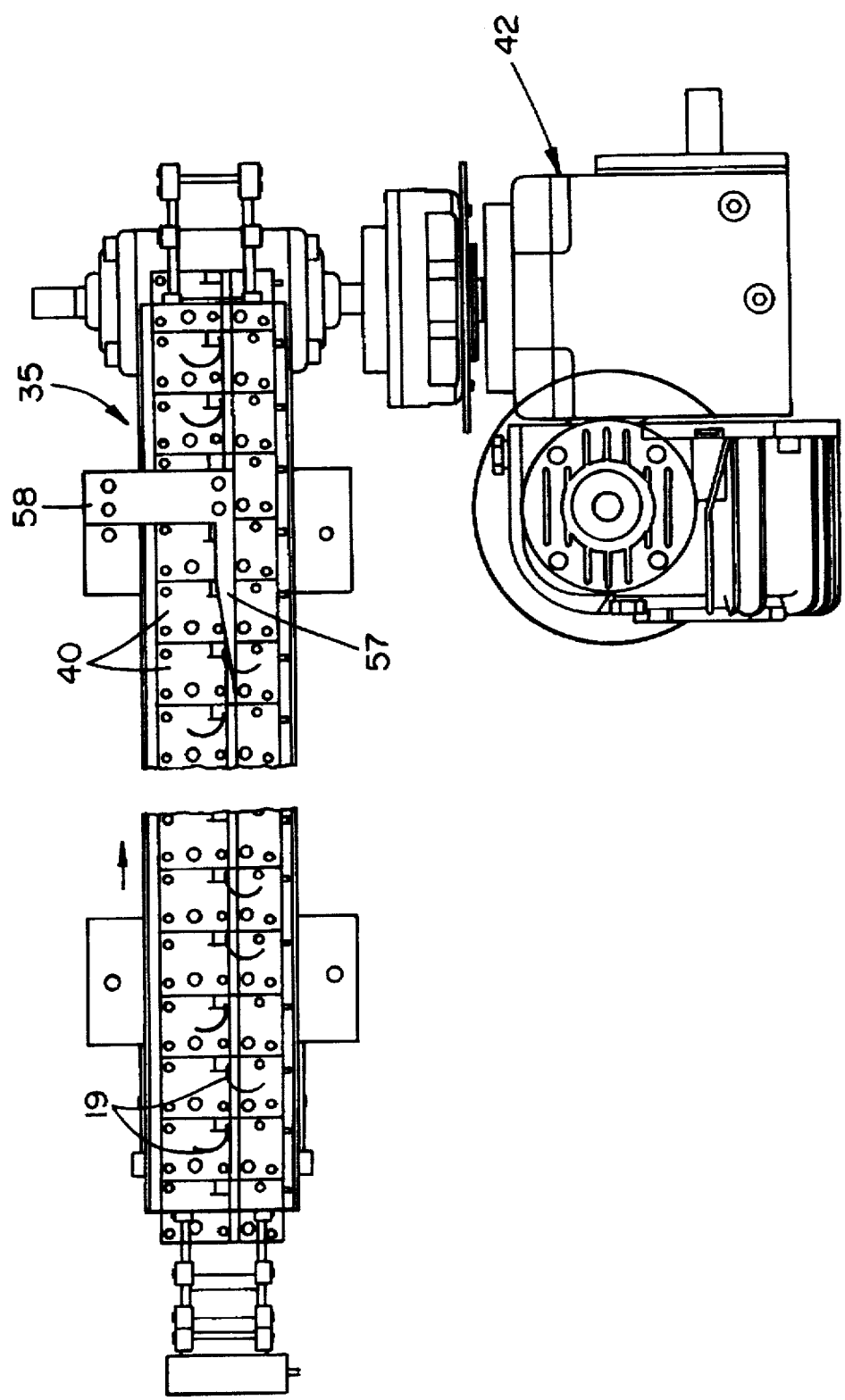
FIG. 5(b) is a top view of the precision conveyor taken from line 5—5 of FIG. 5(a) and is shown carrying needles that have been positioned thereon.

Referring now to FIG. 3(b), there is illustrated the precision conveyor 35 which is driven by drive motor assembly 42 at a rate sufficient to index and transfer one oriented surgical needle per second (1 needle/sec) to the automatic swaging machine. A similar drive motor assembly 43 is provided for driving the indexing conveyors 25a, b. As will be explained in detail below, each drive motor assembly 42,43 is interfaced with and operate under the control of the control system 69 to pause the indexing motion to enable the pick-up and transfer of a needle from the indexing conveyor to the precision conveyor. FIGS. 5(a) and 5(b) illustrate in detail the precision conveyor 35 and the plurality of engagement boats located thereon for engaging respective individual surgical needles 19. Motion of the precision conveyor 35 is also paused periodically at the desired cycle rate to allow for the transfer of the needles 19 thereto from the robots 50a,b. In the preferred embodiment, the control system 69 includes a programmable logic controller (PLC) that is in digital communication with the Adept® robot controllers and the vision tracking system components to control the infeed system.

As shown in FIG. 3(b), the vision tracking system comprises a camera assembly 60 having two video cameras 62 and 64, one located overhead each respective illuminated platform portion, 30a and 30b, for its indexing conveyor 25a. As will be explained in detail below, the video images of the needles obtained from each camera 62,64 are bit-mapped or suitably digitized and transmitted via suitable transmission media, such as communication lines 67a,b shown in FIG. 3(b), to the remotely located control system computer 69 where a Vision Control task processes the video images and inputs the data to each robot 50a,b via communication line 197. Preferably, the conveyors 25a and 25b are translucent and are backlit at the respective portions 30a,b and 33a,b so that a sharp video image may be obtained by the overhead camera assembly for processing. It is understood that for descriptive purposes, only two video cameras 62,64 corresponding to the two illuminated platforms 30a, 30b are shown in FIG. 3(b). However, the invention includes a second set of video cameras (not shown) corresponding to illuminated platforms 33a and 33b for conveyor 25b so that, as mentioned above, binary images of needles on conveyor 25b may be obtained while the robots are picking and placing needles from conveyor 25a. The redundancy designed into this system ensures that there will be no momentary shortage of needles fed to the swaging station and that maximum throughput of oriented needles for input to the swaging station is achieved. In the event the state of robotics technology improves, and as the robot assemblies achieve greater degrees of movement at faster speeds, the second set of cameras and a second robot assembly may no longer be required. Furthermore, a robotic assembly of sufficient speed and precision may be able to pick up randomly deposited needles from a moving conveyor and place them directly in an oriented position at the swaging station.

In the preferred embodiment, each camera 62,64 is mounted approximately one (1) meter above each backlit indexing conveyor 25a, b and utilizes an electrically controlled telephoto lens with a focal distance ranging from 10 mm to 140 mm that may be changed with suitable adaptors. Suitable lens controllers are used to establish lighting/iris, focus, and field of view for each camera lens, and, are interfaced with the Adept® controller via an RS-232 link.

A further component of the control system for the needle sorting and infeed apparatus includes an SCADA Node which is used to oversee and direct the infeed system. This node interfaces with each of the Adept® controllers via discrete RS-232 links which are used to download data information, such as needle parameters, error messages, and status messages, to the Adept® controllers during run-time. The SCADA node may comprise a personal computer or such suitable device, running commercially available FIXDMACS® software. Serial communication is used to exchange the needle parameters entered at the FIX/DMACS "Adept® Setup" screen during a needle changeover procedure which is used to inform the infeed system of the size and type of needles to be processed. After an operator enters the needle parameters and initiates a changeover, the FIX/DMACS Node will transmit these parameters to the robot controller(s).

The robotic/vision control system 69 of the invention comprises individual computer software programs, each associated with a particular task to be performed by the needle sorting and infeed system 10 and executed under the control of the PLC 120. As shown in FIG. 8, the software architecture for controlling the needle sorting apparatus of the instant invention performs eight (8) main tasks: a Robot Control task 150; a Vision Control task 160; a Conveyor Indexing Control task 180; a SCADA Node Interface task 195; A Control Panel task 260; a Task Manager 240; a Conveyor Initiation task 190; and, a Lens Control task 270. Of these eight tasks mentioned above, the first six are active during the needle infeed steady state operation as will be explained below. FIG. 8 additionally shows the data flow among the tasks and the signals which initiate the tasks. It is understood that the software language used in the preferred embodiment, is Adept's V/V+ language, which supports both vision and robotic control in a multitasking environment. Each of the tasks will be generally described below with respect to FIG. 8. A more detailed description of the following tasks can be found in the above-mentioned copending patent application U.S. Ser. No. 08/181,624, entitled "Robotic Control System" (attorney docket No. 8921).

It should be understood to those skilled in the art that each robot assembly, controllers, and camera vision tracking system requires careful calibration and configuration procedures for the infeed system to properly function. For instance, each robot assembly requires that joint positions be set and joint limits be configured to ensure that the robots avoid structural damage when enabled. Furthermore, a camera-to-robot calibration is required so that the vision system may accurately compute the positional coordinates of the needle so that the robot may move to the pick position. This procedure provides a translation matrix between the camera's field-of-view and each robot base position.

The PLC 120 is responsible for initially powering the robot controllers and robots. A robot calibration procedure may be initiated after power-up to move the robot joints to known "home" positions to synchronize the digital encoders (not shown).

The process of starting the PLC 120, robot controllers, and conveyors 25a, b and 35 is time-critical. From the robot controller perspective, when a ROBOT ENABLE signal 219 is raised by PLC 120, it begins its normal cycle by executing the Robot Control Task 150, the Vision Control Task 160, the Conveyor Indexing Control Task 180, and the Conveyor Initiation Task 190; which initiates the movement of conveyor 25a, waits approximately up to two (2) seconds, and then initiates the movement of second conveyor 25b as will be described in detail below. The PLC simultaneously raises the ROBOT ENABLE signal on the other Adept robot. Under this scenario, the PLC integrates the startup of the Bulk Feeding Device System, the Indexing Conveyors, and swaging machine with the raising of the ROBOT ENABLE signal 219. As will be explained in further detail below, when the ROBOT ENABLE signal goes low, the Adept robot halts its standard processing and responds to requests from the SCADA node.

Robot Control Task

There is a single Robot Control task associated with each Adept® controller for each robot assembly 50a,b although only one is indicated as element 150 in FIG. 8. The control system software for the Robot Control task 150 manages the respective robot assembly 50a or 50b as a resource, reads a FIFO buffer 155 of identified needle locations which are produced by and input from the Vision Control Task 160, interfaces with the programmable logic controller (PLC) 120 of control system 69 for needle placement handshaking, and, initiates the indexing of the conveyor belts 25a,b.

The steady state operation of the Robot Control task 150 for each robot assembly 50a, (50b) is as follows:

First, the respective robot controller continuously polls its input FIFO 155 via data line 193 to obtain positional coordinate data for the identified needle locations on a respective translucent conveyor 25a or 25b. The data for the needle locations are provided to the FIFO buffer from the Vision Control task 160 via respective data lines 197 as will be explained in further detail below. When an acceptable (recognizable) needle position is entered into the FIFO buffer 155, the robot controller will remove the needle position from the buffer and direct the robot gripper arm 55a,(55b) to move to that location on the conveyor belt. Next, for each recognized needle, the Robot Control task 150 will signal the robot gripper 55a,(55b) to close on the needle barrel portion 7 and to depart from the conveyor to an approach location proximate the precision conveyor 35. The robot control task then generates a NEEDLE IN GRIPPER signal 207 to the PLC as indicated and waits for a response from the PLC 120. As shown in FIG. 8, when the PLC receives a Robot task generated NEEDLE IN GRIPPER signal 207, the PLC 120 will generate a SAFE TO PLACE signal 191 for receipt by each of the robots 50a,b. The purpose of the SAFE TO PLACE signal 191 is to inform the respective robot assembly 50a,b that a needle may be placed onto a precision conveyor boat 40 of conveyor 35. As a response to the receipt of the SAFE TO PLACE signal 191, the Robot Control task 150 will generate a DON'T INDEX PRECISION CONVEYOR signal 204 for receipt by the PLC 120 immediately before it places the needle on the precision conveyor 35. While this signal remains high, for e.g., at a logic "1" state, the Adept® robot 50a or 50b will attempt to place a needle onto a boat 40 of precision conveyor 35. This involves initiating the engagement jaws 47,49 of the precision conveyor engagement boat 40 to retract to allow the placement of the needle therebetween, as will be explained below. Once the movement of the robot has settled and a needle is placed, the Robot task 150 will generate a NEEDLE PLACE COMPLETE signal 206 for receipt by the PLC 120 and, the PLC will generate a suitable control signal 209 to enable the engagement jaws of the precision conveyor engagement boat 40 to engage the needle. In the preferred embodiment, the dwell time of the NEEDLE PLACE COMPLETE signal 206 is approximately 48–64 milliseconds. After activating this signal, the robot assembly 50a,b will hold the needle in place for the same time period. (48–64 msec.) Immediately thereafter, the robot will open its grippers and move back to its approach location away from the engagement boat 40. Finally, the DON'T INDEX PRECISION CONVEYOR signal 204 is removed indicating that it is now clear for the precision conveyor 35 to index which is performed at the command of the PLC 120.

As a safety interlock for conveyor index initiation, the Robot Control Task 150 will signal the Conveyor Indexing Control Task 180 with an internal control respective LAST PICK signal 192, 196 indicating that the robot assembly, 50a or 50b, has picked up the last needle from the current conveyor as indicated in FIG. 8. If the maximum number of needles expected per current camera field-of-view (hereinafter "FOV") is not picked from the respective current infeed conveyor belt 25a,(b), the Robot Control Task 150 will request the Conveyor Control task 180 to index that conveyor belt "early" via the INDEX CONVEYOR 1 EARLY or the INDEX CONVEYOR 2 EARLY signals 211,212 as shown in FIG. 8. Since all signals affecting the motion of the conveyors are routed through the Conveyor Control task 180, this task will generate a corresponding INDEX CONVEYOR 1 EARLY, signal 211' or INDEX CONVEYOR 2 EARLY, signal 212', for receipt by the other adept robot. If during normal operation a Robot Control Task receives either Index Conveyor 1 Early or the Index Conveyor 2 Early signal, it will flush the contents of its FIFO buffer 155 and continue as if the last needle has been picked from the conveyor.

The control software must take into account the floating 16–32 ms duration of a digital output based on the time slicing of V/V+. This will affect the calculation for minimum time required for placement in conjunction with setting and resetting the Don't Index Precision conveyor signal 204.

The Robot Control Task 150 performs error recovery on two type of errors. These errors are grouped as indexing errors and gross errors. As in all other tasks, gross errors cause the Task Manager 240 error recovery to respond and stop the Robot Control Task immediately. An indexing error occurs if a robot is waiting for a needle to be placed in its parts FIFO and both conveyor belts have not indexed within an appropriate amount of time. The Robot Control Task 150 recovers from this type of error by requesting the other robot to index early via signals INDEX CONVEYOR 1 EARLY and INDEX CONVEYOR 2 EARLY signals 211,212 respectively. This forces both vision/robot control systems to flush the contents of its current parts FIFO and index the conveyor belts.

Conveyor Indexing Control Task

The Conveyor Indexing Control Task 180 initiates the indexing of each respective translucent indexing conveyor 25a, b and the task is initiated by the Conveyor Initiation task 190. All signals affecting the motion of the conveyors are routed through the Conveyor Control task 180.

As shown in FIG. 8, the first step of the Conveyor Indexing Control task 180 is to check for the LAST PICK signal 192,196 internally generated from the Robot Control Task 150 and indicating that the last needle pick-up from the respective infeed translucent conveyor 25a,25b has been completed by one of the Adept® robots 50a,b. Alternatively, the Conveyor Indexing Control task 180 awaits for the INDEX CONVEYOR EARLY (1 and 2) signals 231,232 internally generated from the Vision Control task 160 when no needles are recognized in the current camera FOV. As a result of receiving the LAST PICK signals 192,196 from the robot task, the Conveyor Control task will generate a corresponding INDEX CONVEYOR 1 signal 198, or, an INDEX CONVEYOR 2 signal 199, for receipt by the PLC 120. It is understood that each Adept® robot controller must request the PLC 120 to index a translucent indexing conveyor 25a(,b) after picking up the last needle from the respective conveyor. Therefor, the other Adept® robot must generate its corresponding INDEX CONVEYOR 1 (or INDEX CONVEYOR 2) signal for receipt by the PLC before it can command the current translucent conveyor 25a,(25b) to index. As a result of receiving the INDEX CONVEYOR 1 EARLY, signal 211' or INDEX CONVEYOR 2 EARLY, signal 213' from the Conveyor Control task 180 indicating that the maximum number of needles have not been picked up or that there are no or insufficient needles in the respective camera's FOV, the other Adept robot will generate a corresponding CONVEYOR 1 INDEXED EARLY signal 198', or CONVEYOR 2 INDEXED EARLY signal 199' for receipt by the Conveyor Control task 180, as shown in FIG. 8. These signals will cause the corresponding conveyor 25a(,b) to abort processing and initiate indexing of the belt.

After receipt of both INDEX CONVEYOR 1 or INDEX CONVEYOR 2 signals 198,199 from each of the robot assemblies, the PLC 120 commands the translucent indexing conveyor 25a to index and generates a corresponding CONVEYOR 1 SETTLED signal 241 or, a CONVEYOR 2 SETTLED signal 242 for receipt by the Conveyor Control Task 180. Note that the CONVEYOR 1 SETTLED signal 241 and the CONVEYOR 2 SETTLED signal 242 are raised approximately 2 seconds after the PLC has been requested by the robot control task 150 to index conveyor 25a, (25b). The Conveyor Control Task 180 then informs the Vision Control task 160 to begin needle imaging upon receipt of internal control signals 241',242' that correspond to the respective CONVEYOR 1 SETTLED and the CONVEYOR 2 SETTLED signals 241,242. Once the indexing conveyor 25a (25b) has been indexed and the corresponding CONVEYOR SETTLED signal 241,242 has been received, the Vision Control Task 160 may begin needle recognition in the corresponding cameras's FOV. Specifically, as will be explained below, the cameras 62,64 above conveyor 25a, b each take a snapshot of the respective field of views at respective illuminated portions 30a,b of the translucent conveyor and the Vision Control task 160 will control the processing of the image to make a determination of whether a recognizable needle is present each camera's field of view.

At this point, a distinction must be made between the mere presence or detection of a needle in the field of view and the presence of a "recognizable" needle. A needle may be present, but, for a variety of reasons, the Vision Task 160 may not be able to determine its positional coordinates until the camera vision parameters are changed by the execution of an auto-imaging algorithm which automatically adjusts the iris and vision system lighting parameters of each camera so that the cameras may subsequently obtain enhanced images that may be processed. During steady state, when the vision task has already "recognized" a needle in its respective field of view, the auto-imaging algorithm is not repeated. Details of the auto-imaging algorithm will be explained in detail below.

Vision Control Task

The Vision Control Task 160 controls and processes the images taken by each of the two camera assemblies 62,64.

Since the timing of the two translucent conveyors are phased, only one camera is operating at one time.

Specifically, as shown in FIG. 3(b), the Vision Control task 160 interfaces with each respective camera 62,64 to identify the needle locations of recognizable needles in that camera lens's respective field of view encompassing an area located at respective illuminated platforms 30a,30b. The Vision Task 160 then processes the positional and orientation information of the identified needle locations and writes those locations to the Robot Task FIFO 155 via data lines 197. As mentioned above, the Vision Control task is additionally responsible for initiating an early conveyor index if no needles were imaged in a camera field of view.

As described briefly above, the Vision Control task runs each time either conveyor 25a,25b completes indexing. It is initiated to begin needle recognition upon receipt of either a CONVEYOR 1 SETTLED signal 241' or CONVEYOR 2 SETTLED signal 242' which is generated by the PLC 120 and routed through the Conveyor Control task 180 each time respective translucent indexing conveyor 25a,25b has ceased indexing, as commanded by the Adepts. Each CONVEYOR SETTLED signal 241,242 goes high (logic "1") approximately two (2) seconds after the PLC has been requested by the Adept® robot to index a translucent indexing conveyor. Each of the CONVEYOR SETTLED signals 1 and 2 (241,242) remain high until the PLC 120 receives the next respective INDEX CONVEYOR 1 or 2 signal 198,199 from the Adept robots.

The Vision Task 160 activates that camera which is associated with the conveyor settled signal. When activated, the camera 62,64 takes a picture of the backlit areas 30a,b of the conveyor belt 25a,(25b). Any image obtained is preferably converted to binary image data for subsequent digital processing. The Vision Control task 160 utilizes "vision tools" to detect acceptable needles, and places the coordinates of acceptable needle pick-up points in the FIFO buffer 155 for the Robot task. An "acceptable" needle in the backlit areas is a needle that measures within the tolerances of the needle parameters that have been previously accepted during the needle changeover procedure. The needle changeover procedure is a procedure to inform the infeed system software of the type and size of the needles in the current batch to be processed and must be executed before making needle batch changes as to be discussed below. Specified needle tolerances are for the needle radius, barrel width, angular characteristics of the needle with respect to the robots, and the calculated area as computed from the needle parameters.

Auto-Imaging Algorithm

As mentioned above, if a detected needle is unrecognizable, the auto-imaging algorithm is invoked to change the camera vision parameters. Thus, after the binary image data is processed, a determination is made as to whether the needle image is of the specified radius, whether the needle image is of the specified barrel width, whether the needle image has the specified angular characteristics, and, whether the needle image area is within the specified tolerance. If any of these criteria are out of specification, then an auto-imaging algorithm is executed which functions to take a series of pictures of the same needle image at the respective camera's field of view to thereby enhance the needle image for better needle recognition by improving the vision parameters between pictures. Thus, after each of the series of pictures is taken, the auto-imaging algorithm will automatically adjust the camera's iris and vision system lighting parameters to enable the vision system to image the needles properly within the camera's field of view. For example, when adjusting the lighting of the fields of view, certain camera vision parameters such as the gain, offset, and binary threshold may be modified. The auto-imaging algorithm is executed until a needle is recognized in each camera's field of view and is not repeated until a needle changeover is executed.

Even when the cameras of the Vision Control task 160 are adjusted, needle images may still not be imaged properly. This is because each camera's field of view utilizes a backlighting source and needles that overlap, touch with each other, or, are clipped by field of view edge boundaries will not be considered for recognition. Thus, the Vision Control task will make a determination of whether the needles overlap or touch each other, and, will determine whether the needles are too close to the edge of the field of view.

After all of the possible needles are recognized, the Vision Control task will calculate the needle pick-up coordinates of the acceptable needles and place them in the Robot Control task FIFO buffer 155 to enable the robot to pick and place the acceptable needle onto the precision conveyor. In the preferred embodiment, the maximum number of needles that can be recognized during each dwell cycle of each translucent indexing conveyor is three (3). If less than this maximum or if no needles are recognized, a robot may be signalled to index the corresponding conveyor early, causing the vision system to abort its processing as described above.

Vision Task 160 is responsible for limiting the number of needle locations written to the FIFO to three, since the Robot Control Task will pick and place a needle for every needle location passed to the FIFO 155. In the preferred embodiment, the Vision Task is limited to operate for five seconds per indexing conveyor cycle.

The Vision Control Task 160 performs error recovery on three types of errors. These errors are grouped as imaging errors, processing errors, and gross errors. The gross errors cause the Task Manager error recovery to respond and stops the Vision Control Task 160 immediately. When an imaging error occurs, the Vision Control Task 160 suspends all execution on the current FOV and requests an early index of the conveyor belt by generating either INDEX CONVEYOR 1 EARLY or INDEX CONVEYOR 2 EARLY signals 231, 233 as discussed above. Receipt of these signals causes no needles to be placed in the parts FIFO and forces both vision/robot systems to pass on the current FOV of needles. If a processing error occurs, the Vision Control Task suspends all processing on the current needle and begins processing a new needle in the same FOV if another needle is available. As a result, the Vision Task does not insert the needle into the parts FIFO.

Conveyor Initiation Task

Figure 7:
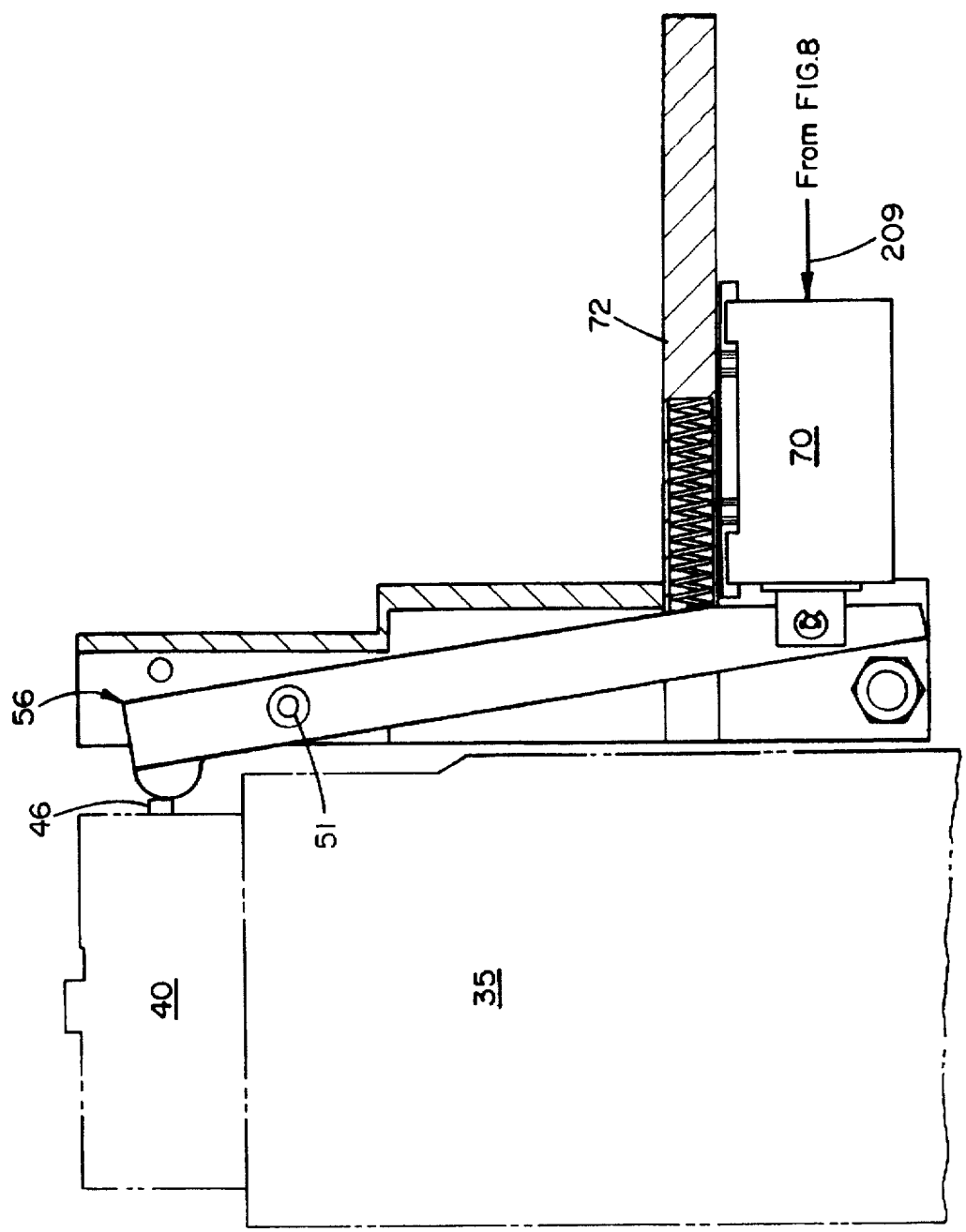
FIG. 7 is a side view of the robot load solenoid that actuates the jaws of the precision conveyor boat.

The Conveyor Initiation Task 190 functions to initiate the Conveyor Indexing Control task 180 and is started whenever the ROBOT ENABLE signal 219 is raised from the PLC 120. Once started, this task requests an INDEX INFEED CONVEYOR 1 (25a), signal 237, then waits approximately two (2) seconds, and requests an INDEX INFEED CONVEYOR 2 (25b), signal 239, as shown in FIG. 7. The task 190 is then terminated and is not restarted again until the ROBOT ENABLE signal 219 is lowered and raised again.

Task Manager

The Task Manager 240 initializes the software and hardware I/O signals, the global variables, and the vision/robot system tasks. Once the vision/robot system tasks are running, the task manager monitors the integrity and status of each task currently running and the resources that are controlled by these tasks. The status poll signals 247a–247f are indicated in FIG. 8. The resources are the robot, communication ports, and the I/O signal lines. The Task Manager reports any errors to the PLC, via the SYSTEM FAIL signal 222, and the SCADA node, via the SCADA Node Interface Task 195. The SYSTEM FAIL signal 222 is generated whenever a robot (as detected by the Task Manager) has recognized a gross error which prevents it from continuing operation. This signal is active-low and remains low until the Adept robot is reset. Thus, the PLC must lower the ROBOT ENABLE signal 219 immediately upon receiving this signal.

For gross errors occurring with the vision/robot control software, the Task Manager 240 is utilized to detect and recover from these errors by continuously polling the status and integrity of all steady-state tasks and resources during program execution. If it is determined that a gross error has occurred, the SYSTEM FAIL signal 222 will be raised to the PLC 120 and all tasks except the SCADA Node Interface Task, the Control Panel Task and the Task Manager will be stopped. A code indicating the reason for the last unrecoverable error will be available to the SCADA Node through the SCADA Node Interface Task. In some cases, an error message will be displayed in the Monitor Window of the Adept robot controller. After the SYSTEM FAIL signal is raised, the Task Manager will attempt to correct any problems detected on the robot and notify the operator through the Monitor Window. In most cases, the operator will only need to raise the ROBOT ENABLE signal again to re-set the vision/robot control software.

Control Panel Task

The Control Panel Task 260 presents a mouse controlled panel that allows an operator to access various software "debugging" utilities, to access diagnostics utilities, to control the speed of the robot, and to select new positions that the robot will move to for picking and placing needles. Also, the Control Panel Task allows the operator to stop the vision/robot system tasks from executing.

SCADA Node Interface task

The SCADA Node Interface task 195 polls the SCADA Node RS-232 interface for messages from the SCADA node. The task will act as slave to SCADA Node requests for Adept and camera set-up procedures necessitated by product changeovers. These requests are valid only when the ROBOT ENABLE signal 219 is deactivated.

Lens Control Task

The Lens Control Task 270 is initiated only when the SCADA node requests a new product to be introduced to the vision system and is executed only as an off-line process. The Lens Control Task 270 accepts the new needle parameters and adjusts the field-of-view size for both cameras to accommodate the new product size. The zoom, focus, and iris lenses are affected by this new product introduction, as well as internal vision system parameters, such as gain, binary threshold, and offset, used for imaging. Once the cameras are adjusted, the task is suspended until another new product is introduced to the vision/robot system. Product Changeover Prior to enabling the robots to begin the needle infeed process, a Needle Changeover procedure is invoked to inform the Vision and Robot Control tasks of the control system software of the type and size of the needles to be processed. This needle changeover procedure must be completed before making needle batch changes. If a changeover is not completed before the first needle batch run after power-up, an error message will be displayed at the FIX/DMACS (SCADA Node) screen when the robots are enabled and the robots will not run. If a changeover is not completed between different needle batch runs, the vision tasks will not identify any needle being run.

Essentially, an operator of the system enters the needle parameters in appropriate units, e.g., millimeters and degrees at the FIX/DMACS screen of the SCADA task 195 through data lines 229. Such needle parameters for use by the Vision tasks include, the needle radius and the radius tolerance, acceptable needle angles and their tolerances, and, the needle width and the width tolerance.

In addition to inputting needle change parameters for the vision tasks, initial camera set-up parameters associated with the particular batch of needles to be processed are also input through the SCADA Node for use by the system. The software utilizes the information provided by the user via the SCADA Node to automatically adjust the lens for the correct field-of-view size, focus, and zoom parameters prior to enabling the robots.

Figure 6A:
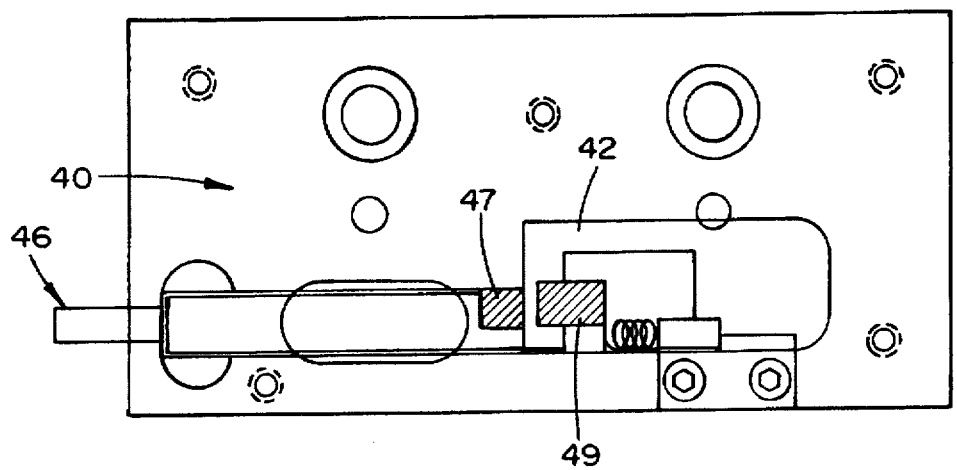
FIG. 6(a) is a detailed view of the precision conveyor boat having jaws for engaging and retaining an oriented needle for subsequent swaging.
Figure 6B:
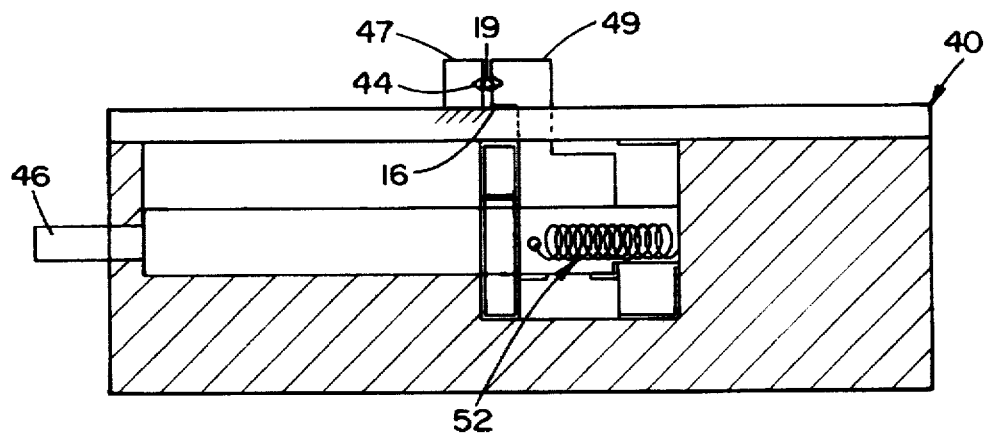
FIG. 6(b) is a detailed elevation view of the precision conveyor boat taken along line 6—6 of the boat illustrated in FIG. 6(a).
Figure 6C:
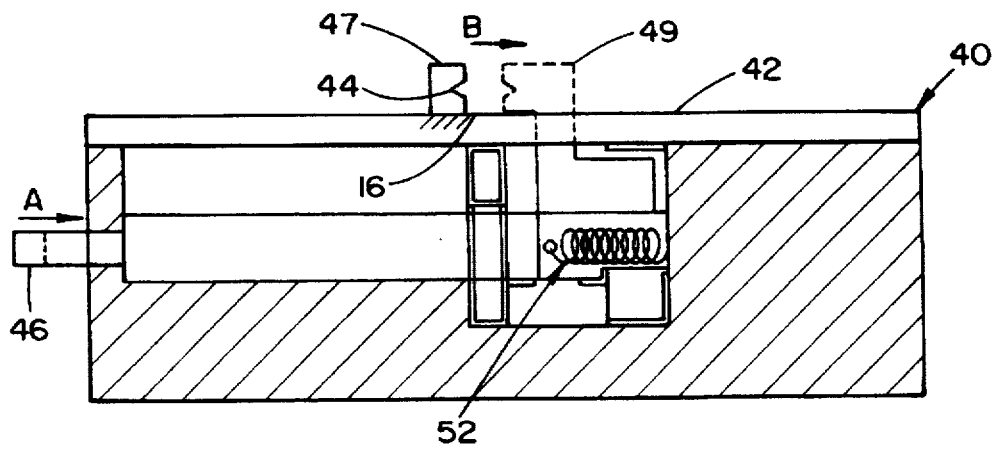
FIG. 6(c) is a detailed view of the precision conveyor boat with movable jaw extended for placement of needle oriented for automatic swaging.

FIGS. 6(a)–6(c) illustrate the precision conveyor boat 40 to which each needle 19 is transferred. Each boat is preferably provided with a pair of jaws; one jaw 47 being fixedly mounted, and the second jaw 49 being slidable within pocket 42. In operation, a push rod 46 is pressed in the direction of the arrow "A" shown in FIG. 6(c) to compress spring 52 which retracts the position of the movable jaw 49 in the direction indicated by the arrow "B" to allow for placement of needle 19 within the notch 44 of both jaws. Normally, spring 52 is biased as shown in FIG. 6(b) to maintain movable jaw 49 in its engaged position for retaining a needle 19 in the notch 44. It should be understood that any type of releasable engaging mechanism may be provided for releasably retaining a needle 19 on conveyor boat 40, provided that each needle be correctly oriented on its respective boat for subsequent swaging to take place.

FIG. 7 illustrates a robot load solenoid mechanism 70 that is activated by signal line 209 from the PLC 120 each time a needle 19 is being transferred to a precision conveyor boat 40 as described above. The robot load solenoid 70 may be mounted to the precision conveyor by an appropriate mounting plate 72. A sensor mounted on the precision conveyor, is provided to sense the proximity of the precision conveyor boat 40. At such time a conveyor boat is dwelled for transference of a needle 19 thereto, a release arm 56 of the robot load solenoid is actuated by solenoid 70 to pivot about pin 51 to depress push rod 46 and retract the movable jaw 49 to the position illustrated in FIG. 6(c). The robot arm 51 then positions the needle 19 between the jaws 47,49 of conveyor boat 40 for engagement thereof. The release arm 56 is then retracted by spring 78 as the conveyor boat 40 resumes movement.

Figure 9B:
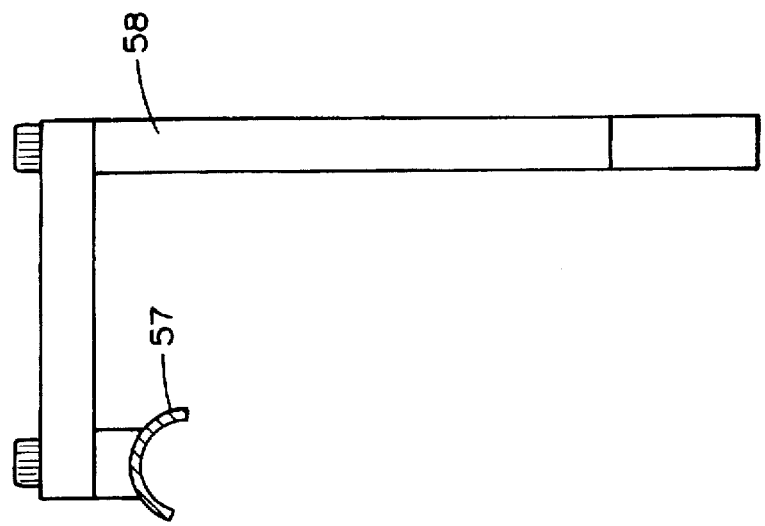
FIG. 9(b) is a front view of the plow taken along line 9—9 of FIG. 9(a).
Figure 9A:
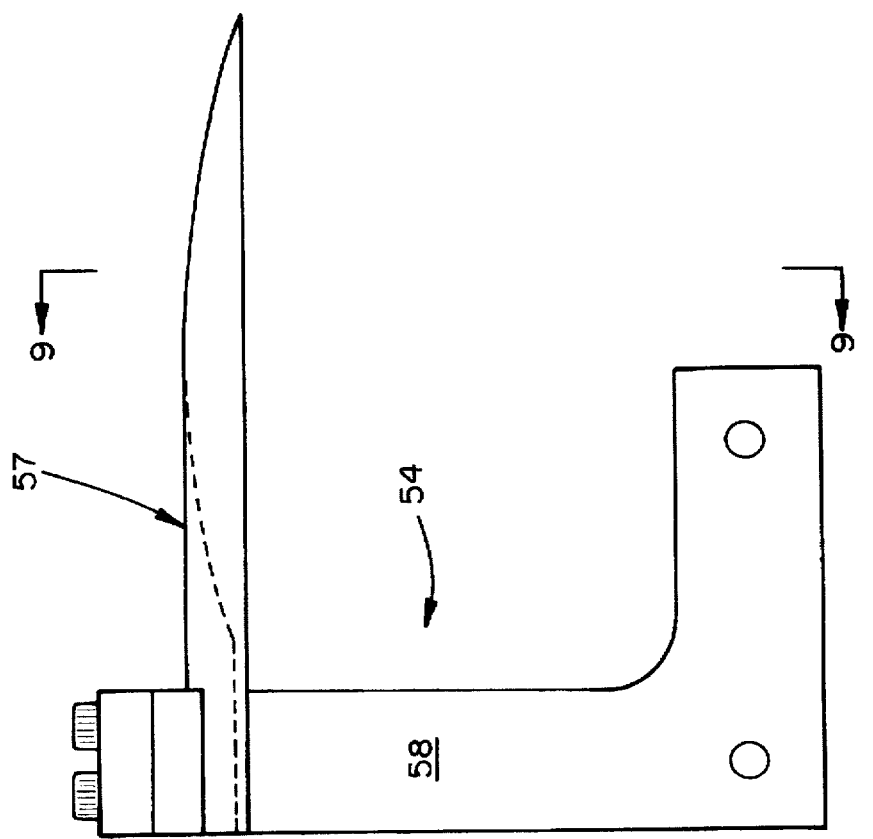
FIG. 9(a) is a side view of the needle rollover (plow) which ensures uniform orientation of the needle on the conveyor boat prior to automatic swaging.
Figure 9E:
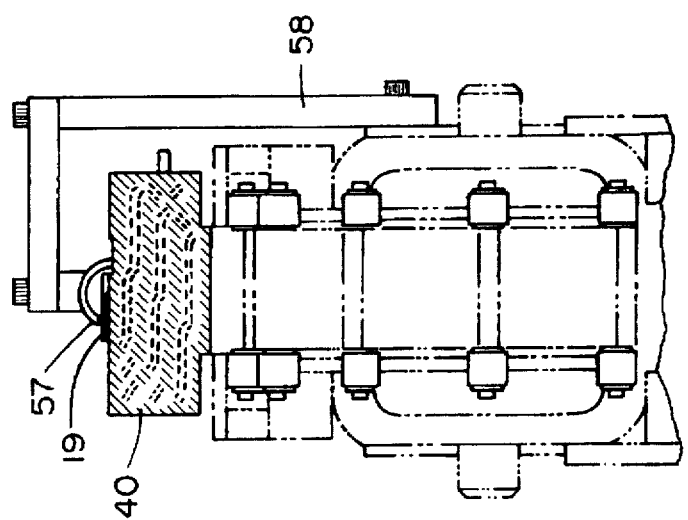
FIGS. 9(c)-9(e) is a front view illustrating the plow 54 orienting a needle in one direction upon a boat 40 of the precision conveyor.
Figure 9D:
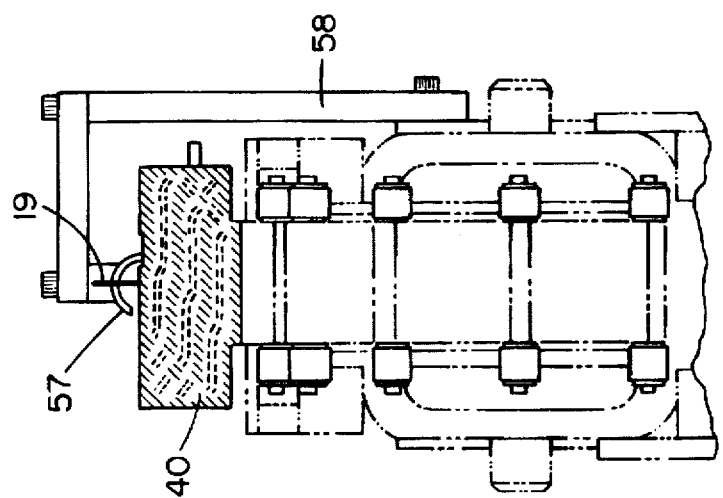
Figure 9C:
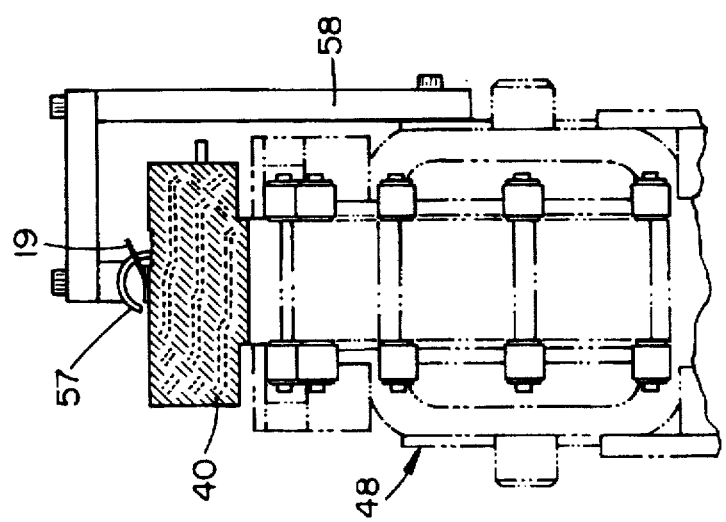

For automatic swaging to take place at the swaging station it is necessary that the needle be precisely positioned within the notch 44 of engagement jaws 47,49 of the boat 40. This is because the multi-axis gripper generally indicated at step 17 in the system flow chart of FIG. 1, must receive a precisely positioned needle for a suture (not shown) to be placed within the suture receiving end 85 of needle 19. To ensure that each needle is uniformly oriented for transference to the multi-axis gripper of the automatic swaging station, a needle orientation device ("plow") 54 is provided as shown in FIGS. 5(b) and 9(a) to orient each needle while engaged between jaws 47,49 on conveyor boat 40. The plow comprises an elongated arcuate blade 57 protruding from a mounting bracket 58 as best shown in FIGS. 9(a) and 9(b). In the preferred embodiment shown in FIG. 5(b) and FIG. 9(c), the plow is fixedly mounted at one end 48 of the precision conveyor 35 to enable arcuate blade 57 to scoop needle 19 positioned on the conveyor boat 40 while in forward motion. After contact is made, the arcuate portion 87 of the needle 19 is lifted and rolls over the arcuate blade 57 of the plow 54 as shown in FIGS. 9(c) through 9(e). Provision of the plow 54 ensures that each needle conveyed to the suture swaging station is oriented in the same direction.

Figure 10A:
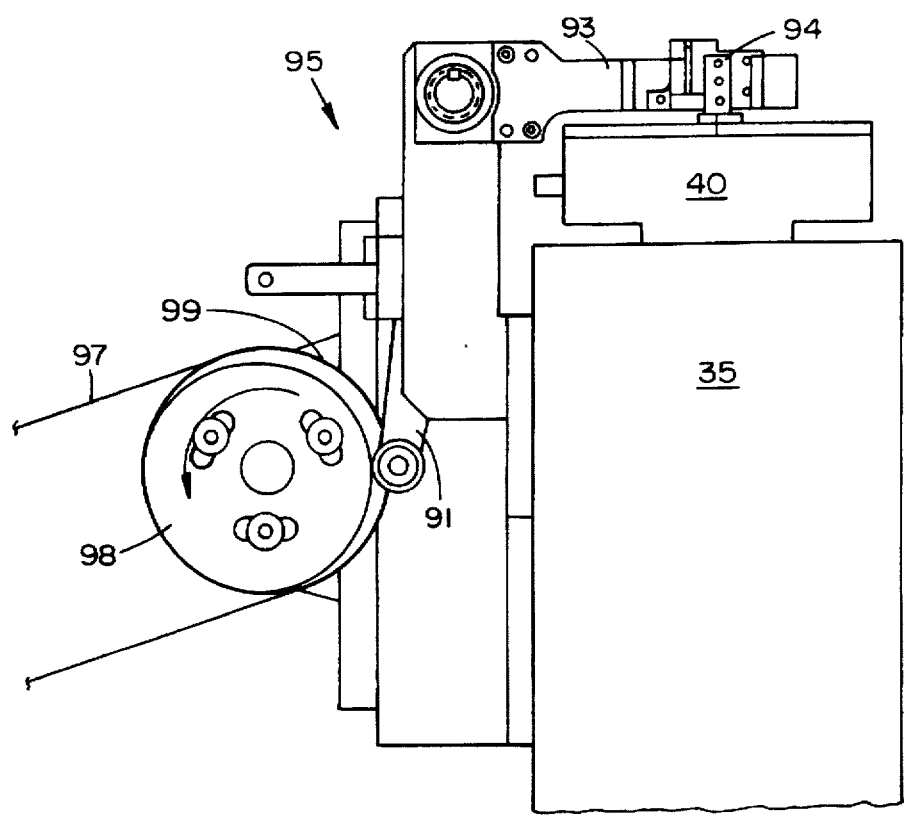
FIG. 10(a) is a side view of the needle hard stop assembly 95 for further orienting the needle 19 within the engagement jaws of conveyor boat 40.
Figure 10B:
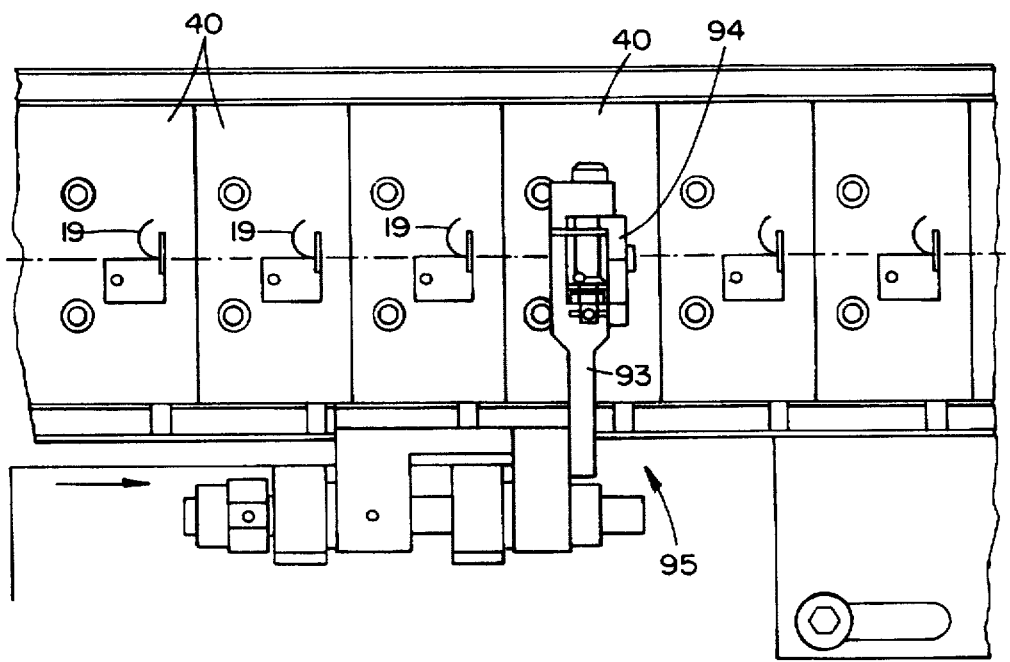
FIG. 10(b) is a top plan view of the needle hard stop assembly 95 for further orienting the needle 19 within the engagement jaws of conveyor boat 40.

Another mechanism is provided for further orienting the needle upon the precision conveyor boat is the needle hard stop assembly 95 illustrated in FIG. 10(a) and 10(b). The hard stop assembly 95 comprises a pulley 99 operable by a drive motor (not shown) and timing belt 97 for rotating a cam 98 as shown in FIG. 10(a). Cam follower 91 is provided for actuating arm stop 93 to reciprocate from a first position above the engagement jaws 47,49 of conveyor boat 40, to a position that enables blade 94 of arm stop 93 to bear upon the end 85 of needle 19 while the precision conveyor boat 40 is conveyed in the forward direction as indicated by the arrow in FIG. 10(b). Impeding the forward motion of the needle 19 by blade 94 forces the needle to move within engagement jaws 47,49 of the conveyor boat 40 so that the engagement jaws 47,49 engage the needle at a precise location, for e.g., its barrel portion 83. Note that the cam 98, as driven by timing belt 97, is designed so that the arm stop 93 reciprocates in a timed relation with the forward motion of the boat 40 as dictated by the Robot Control tasks 150 and PLC 120, so that each needle upon each conveyor boat 40 is further oriented. After the needle is oriented, the arm stop 93 is reciprocated to its position above the conveyor boat 40 to await the next needle for further orientation in the manner heretofore described.

Figure 11B:
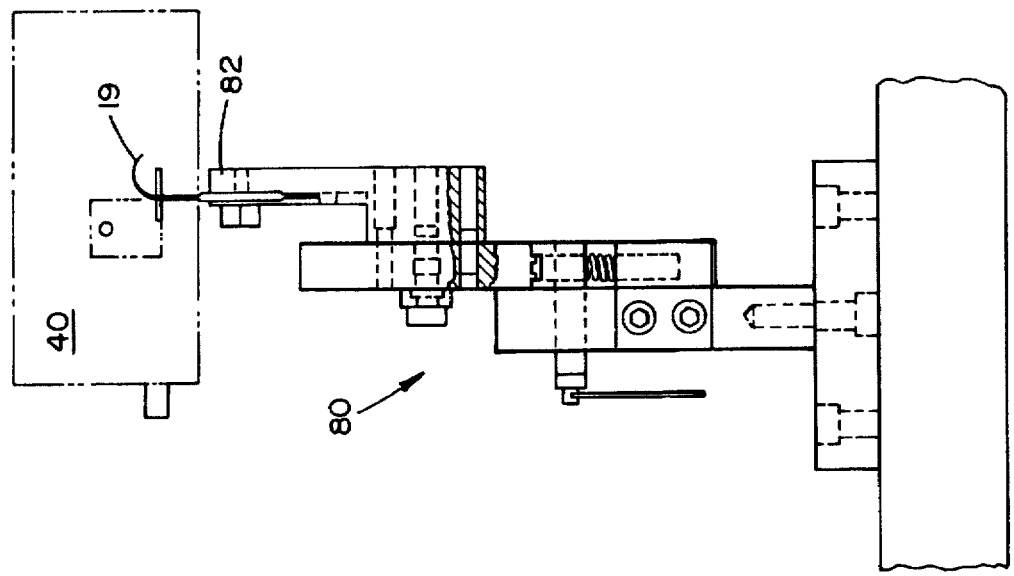
FIG. 11(b) is a front view of the stop assembly 80 for further orienting the needle 19 upon conveyor boat 40 taken along line 11—11 of FIG. 11(a).
Figure 11A:
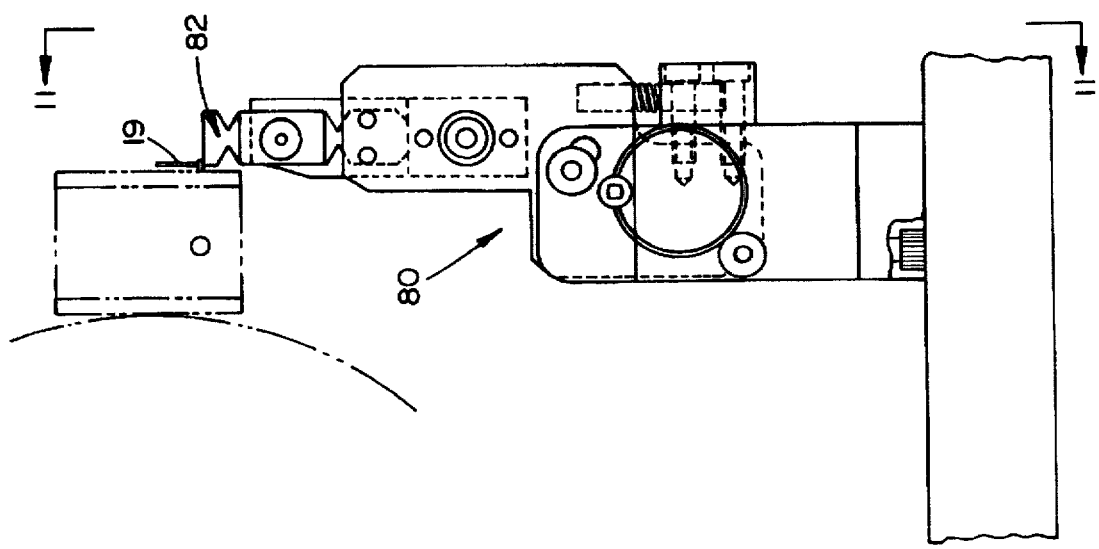
FIG. 11(a) is a side view of the stop assembly 80 for further orienting the needle 19 upon conveyor boat 40.

After the precision conveyor boat 40 is equipped with a properly oriented needle 19 in the manner described above, it is conveyed to an automatic swaging station (not shown) where a suture is fixedly attached to the needle. A stop assembly 80, shown in FIGS. 11(a) and 11(b), is the mechanism for executing a hard stop of the needle carrying conveyor boat 40 when the boat has reached the end of its destination at the needle swaging station. The blade 82 of the hard stop assembly 80 provides a fine tuning of the position of the needle upon the boat 40. Specifically, the blade 82 orients the needle to within 0.001 inches of the final position required for automatic swaging to take place.

While the invention has been particularly shown and described with respect to the preferred embodiments thereof, it will be understood by those skilled in the art that the foregoing and other changes in form and details may be made therein without departing from the spirit and scope of the invention, which should be limited only by the scope of the appended claims.

What is claimed:

1. An automatic needle sorting and infeed apparatus comprising:
    (a) means for depositing a random distribution of needles at a predetermined rate upon a first conveyor means;
    (b) means for obtaining an image of said needles at one or more predetermined locations upon said first conveyor means, said means including digitizing means for converting said image into digital signals, said means for obtaining the image having a field of view that encompasses a predetermined number of said needles, said predetermined number being chosen to allow recognition of barrel portions and blade portions of said needles;
    (c) computer control means for processing said digital signals to obtain positional and orientation data for one or more imaged needles upon said first conveyor means; and
    (d) robotic transfer means, which positions and reorients itself in accordance with said positional and orientation data to remove said needle from said first conveyor means in accordance with its respective positional and orientation data and position said needle upon a second conveyance means for conveyance to a processing location.

2. The automatic needle sorting and infeed apparatus as claimed in claim 1 wherein said means for depositing the random distribution of said needles further includes means for singulating each of said predetermined number of said needles prior to deposition upon said first conveyor means, each of said singulating needles being deposited upon said first conveyor means in a spaced apart relation so that said predetermined number of needles are in said field of view.

3. The automatic needle sorting and infeed apparatus as claimed in claim 1 wherein said transfer means includes one or more robot means each robot means having a gripper means for picking up needles from said first conveyor means, and placing said needles upon said second conveyance means.

4. The automatic needle sorting and infeed apparatus as claimed in claim 1 wherein said second conveyance means includes one or more engagement devices for gripping a respective needle, said transfer means placing each said needle in a respective engagement device.

5. The automatic needle sorting and infeed apparatus as claimed in claim 1 wherein said computer control means further includes memory means for storing said positional and orientation data corresponding to said imaged needles, said transfer means including means for accessing said memory means to obtain said positional and orientation data corresponding to said imaged needles.

6. The automatic needle sorting and infeed apparatus as claimed in claim 1 wherein said means for obtaining an image of said randomly deposited needles includes one or more camera means, each of said one or more camera means in communication with said computer control means.

7. The automatic needle sorting and infeed apparatus as claimed in claim 6 wherein each of said camera means obtains a video image of said needles upon said first conveyor means at each of respective said one or more predetermined locations within a field-of-view of each of said one or more camera means.

8. The automatic needle sorting and infeed apparatus as claimed in claim 2 wherein said singulating means further includes at least one reciprocating door means that alternates between a first and second position to split said predetermined amount of needles into first and second groups of needles,
    wherein said first group is deposited upon said first conveyor means when said reciprocating door means is in said first position, and said second group is deposited upon a third conveyor means when said reciprocating door means is in said second position.

9. The automatic needle sorting and infeed apparatus as claimed in claim 5 wherein said robot means is in communication with said memory means, said robot means accessing said memory means to obtain said positional and orientation data corresponding to said imaged needles.

10. The automatic needle sorting and infeed apparatus as claimed in claim 4 wherein each of said engagement devices includes a pair of engaging jaws for engaging a needle positioned therebetween by said transfer means.

11. The automatic needle sorting and infeed apparatus as claimed in claim 10 wherein each said engagement device further a includes spring means for biasing a first movable jaw of said pair of engaging jaws into engagement with a second fixed jaw of said pair of engaging jaws to retain said needle positioned therebetween.

12. The automatic needle sorting and infeed apparatus as claimed in claim 11 wherein each of said engagement devices further includes means for retracting said first movable engaging jaw from engagement with said second fixed jaw prior to positioning said needle therebetween.

13. The automatic needle sorting and infeed apparatus as claimed in claim 12 wherein said means for retracting said first movable jaw from engagement with said second fixed jaw is a push rod for pushing said first movable jaw in opposition to said bias of said spring means.

14. The automatic needle sorting and infeed apparatus as claimed in claim 4 further including a first orienting means for orienting each said needle in a uniform direction while positioned upon said second conveyance means.

15. The automatic needle sorting and infeed apparatus as claimed in claim 14 further including a second orienting means for further orienting said needle axially within said pair of engagement jaws.

16. The automatic needle sorting and infeed apparatus as claimed in claim 15 further including a third orienting means for further orienting said needle to within 0.001 inch of a desired predetermined orientation for said needle upon said second conveyance means.

17. The automatic needle sorting and infeed apparatus as claimed in claim 1, wherein said robotic transfer means is a multi-jointed four axis transfer means.

18. The automatic needle sorting and infeed apparatus as claimed in claim 1, wherein said robotic transfer means comprises four joints, including two joints for dual rotating motion, and two joints for dual axis linear translation.

19. The automatic needle sorting and infeed apparatus as claimed in claim 1, wherein said needle deposition means includes a vibratory bowl that periodically deposits a set of said needles on said first conveyor means.

20. The automatic needle sorting and infeed apparatus as claimed in claim 19, wherein said set of said needles includes up to six needles.

21. The automatic needle sorting and infeed apparatus as claimed in claim 1, wherein said needle deposition means includes a counter that counts a desired number of needles to form a set of needles for periodic deposition on said first conveyor means.

22. The automatic needle sorting and infeed apparatus as claimed in claim 1 further includes means for singulating said needles so that no more than said predetermined number of said needles are in the field of view of said image obtaining means at one time.

23. The automatic needle sorting and infeed apparatus as claimed in claim 1, wherein said predetermined number is three.

24. An automatic needle sorting and infeed apparatus comprising:
   (a) means for depositing a random distribution of needles upon a first conveyor means;
   (b) means for obtaining an image of said needles deposited upon said first conveyor means, said means for obtaining an image having a field of view that encompasses a predetermined number of needles for differentiating between opposite ends of each needle of said predetermined number of needles, said means including digitizing means for converting said image into digital signals;
   (c) computer control means for processing said digital signals to obtain positional and orientation data for said each needle; and
   (d) robotic transfer means which, in response to said positional and orientation data, moves to a location of said each needle, removes said each needle from said first conveyor means in accordance with its respective positional and orientation data, and positions said each needle upon a second conveyance means for conveyance to a processing location.

* * * * *